(12) United States Patent
Rowe et al.

(10) Patent No.: US 8,190,385 B2
(45) Date of Patent: May 29, 2012

(54) SYSTEM AND METHOD FOR TESTING A SOLAR PANEL

(75) Inventors: Peter T. Rowe, San Jose, CA (US); James F. Ward, San Francisco, CA (US)

(73) Assignee: Halliburton Energy Services, Inc., Houston, TX (US)

( * ) Notice: Subject to any disclaimer, the term of this patent is extended or adjusted under 35 U.S.C. 154(b) by 491 days.

(21) Appl. No.: 12/111,820

(22) Filed: Apr. 29, 2008

(65) Prior Publication Data

US 2009/0267632 A1 Oct. 29, 2009

(51) Int. Cl.
*G01R 19/00* (2006.01)
*G06F 11/30* (2006.01)
(52) U.S. Cl. .......... 702/64; 702/182; 702/183; 702/184
(58) Field of Classification Search .......... 702/179–189, 702/48–64
See application file for complete search history.

(56) References Cited

U.S. PATENT DOCUMENTS

| 4,163,194 A * | 7/1979 | Ross ..................... 324/761.01 |
| 4,467,438 A * | 8/1984 | Zerlaut et al. ................ 356/405 |
| 2008/0147335 A1* | 6/2008 | Adest et al. ...................... 702/64 |
| 2008/0164766 A1* | 7/2008 | Adest et al. ...................... 307/80 |

* cited by examiner

*Primary Examiner* — Phuong Huynh
(74) *Attorney, Agent, or Firm* — Schwegman, Lundberg & Woessner, P.A.

(57) ABSTRACT

A system and method for testing a solar panel. The system comprises an apparatus to be coupled electrically to two solar panels. The apparatus includes a processor and a memory having stored thereon instructions for calculating a ratio of respective operating parameters of the two solar panels. The apparatus further can include an output device, such as to display the ratio of the respective operating parameters of the solar panels. The apparatus may further comprise two loads coupled to the processor to be electrically coupled to the respective solar panels.

23 Claims, 6 Drawing Sheets

SYSTEM AND METHOD FOR TESTING A SOLAR PANEL

BACKGROUND

The present disclosure relates in general to solar panels, and in particular to a system and method for testing a solar panel.

DETAILED DESCRIPTION

Figure 1:
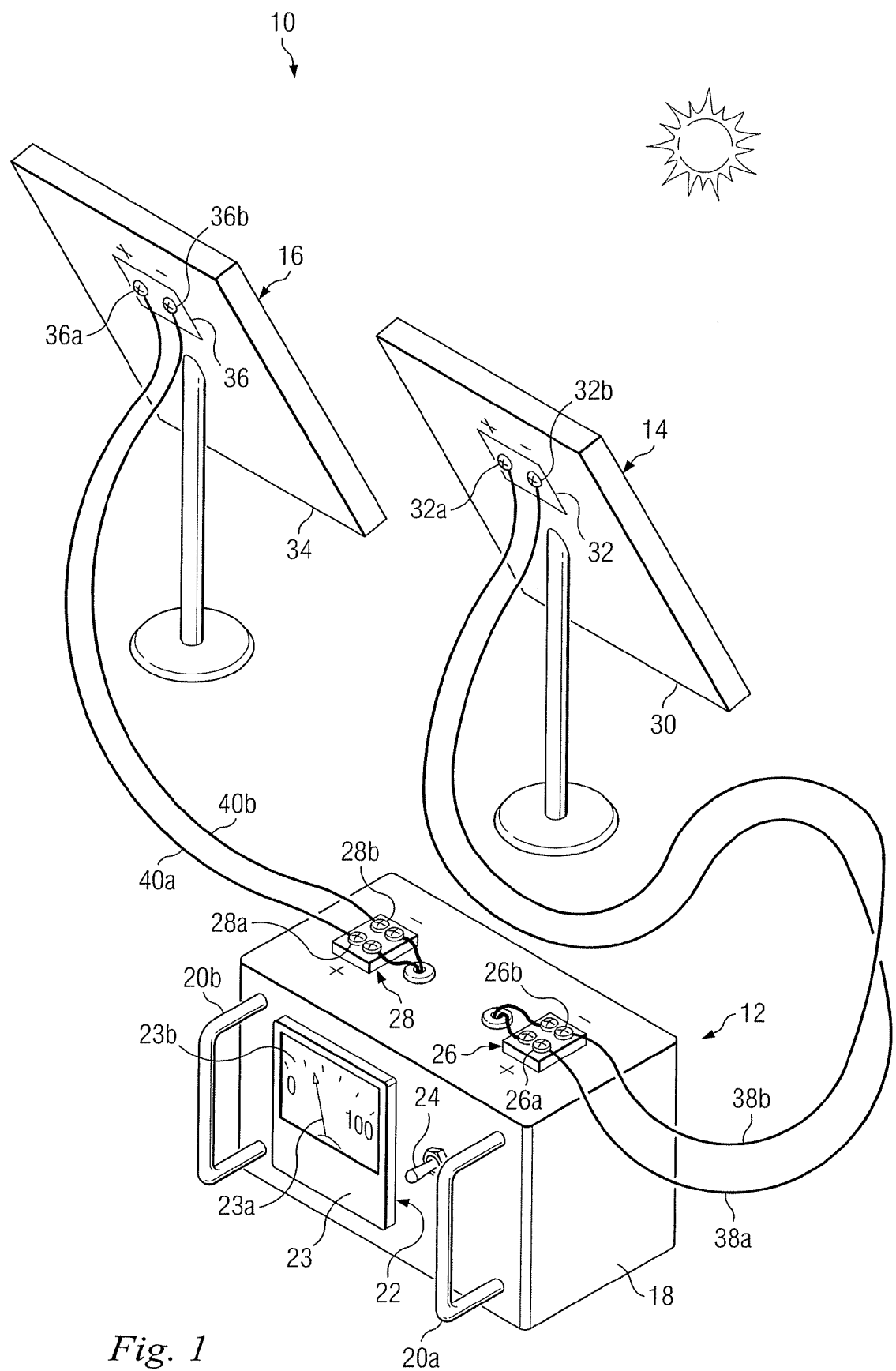
FIG. 1 is a perspective view of a system according to an exemplary embodiment, the system including a test apparatus according to an exemplary embodiment, and two solar panels according to respective exemplary embodiments.

In an exemplary embodiment, as illustrated in FIG. 1, a system is generally referred to by the reference numeral 10 and includes a test apparatus 12 and solar panels 14 and 16 electrically coupled thereto. The apparatus 12 includes an enclosure 18 from which handles 20a and 20b extend, an output device 22, a switch 24, a terminal board 26 including a positive terminal 26a and a negative terminal 26b, and a terminal board 28 including a positive terminal 28a and a negative terminal 28b. In an exemplary embodiment, the output device 22 is, or at least includes, an analog meter 23 including a needle 23a and a scale 23b ranging from 0 to 100, or 0% to 100%, as shown in FIG. 1. In several exemplary embodiments, instead of, or in addition to the analog meter 23, the output device 22 is, or at least includes, a graphic display, a digital display, a liquid crystal display, a printer, a plotter, and/or any combination thereof.

The solar panel 14 includes a frame 30 and one or more photovoltaic or solar cells (not shown) coupled thereto, and a junction box 32 including a positive terminal 32a and a negative terminal 32b. Likewise, the solar panel 16 includes a frame 34 and one or more photovoltaic, or solar, cells 35 coupled thereto, and a junction box 36 including a positive terminal 36a and a negative terminal 36b. In several exemplary embodiments, one or both of the solar panels 14 and 16 are adapted to convert solar energy into electrical power and supply such electrical power to systems and/or devices used in, for example, oil and gas exploration, development, and/or production operations, such as, for example, surface tiltmeter fracture mapping operations, hydraulic impedance testing operations, reservoir monitoring operations, and/or any combination thereof. In an exemplary embodiment, the solar panel 14 is a new solar panel that has never been used before in the field, or is a solar panel that has undergone only minimal use in the field. In an exemplary embodiment, the solar panel 14 is a solar panel that is considered to be a "good" solar panel having acceptable operational integrity and performance. In an exemplary embodiment, the solar panel 16 is a solar panel that has been used in the field, and is to be tested in a manner described below. In an exemplary embodiment, the solar panel 16 is a solar panel having an unknown degree of operational integrity and performance, and is to be tested in a manner described below.

A test lead-in wire 38a electrically couples the positive terminals 26a and 32a, and a test lead-in wire 38b electrically couples the negative terminals 26b and 32b. Likewise, a test lead-in wire 40a electrically couples the positive terminals 28a and 36a, and a test lead-in wire 40b electrically couples the negative terminals 28b and 36b.

Figure 2:
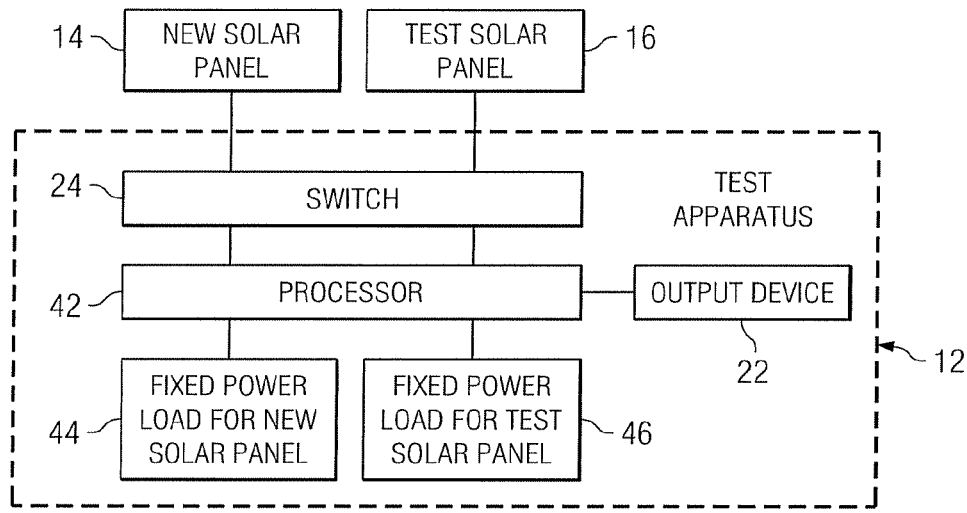
FIG. 2 is a diagrammatic illustration of the system of FIG. 1 according to an exemplary embodiment.

In an exemplary embodiment, as illustrated in FIG. 2 with continuing reference to FIG. 1, the test apparatus 12 includes a processor 42 electrically coupled to the switch 24, the output device 22, a fixed power load 44, and a fixed power load 46. The solar panel 14 is selectively electrically coupled to the switch 24, the processor 42, and the fixed power load 44, with the selective electrical coupling being permitted by, and dependent upon the position of, the switch 24. Similarly, the solar panel 16 is selectively electrically coupled to the switch 24, the processor 42, and the fixed power load 46, with the selective electrical coupling being permitted by, and dependent upon the position of, the switch 24. The processor 42 includes, and/or is operably coupled to, a computer readable medium or memory 42a in which instructions accessible to, and executable by, the processor 42 are stored. In an exemplary embodiment, the processor 42 is in the form of, and/or includes, a computer, and/or one or more microcontrollers. In an exemplary embodiment, the processor 42 includes one or more of the following: a computer, a programmable general purpose controller, an application specific integrated circuit (ASIC), other controller devices, and/or any combination thereof. In an exemplary embodiment, the switch 24 is a double pole double throw (DPDT) momentary switch. In an exemplary embodiment, the switch 24 includes a plurality of switches, with each of the solar panels 14 and 16 being selectively electrically coupled to at least one switch in the plurality of switches. In an exemplary embodiment, each of the power loads 44 and 46 includes one or more resistors.

In an exemplary embodiment, the processor 42 is remotely located from the enclosure 18. In an exemplary embodiment, the processor 42 is remotely located from the enclosure 18 and is wireless communication with one or more of the solar panels 14 and 16, the switch 24, the loads 44 and 46, and the output device 22.

Figure 3:
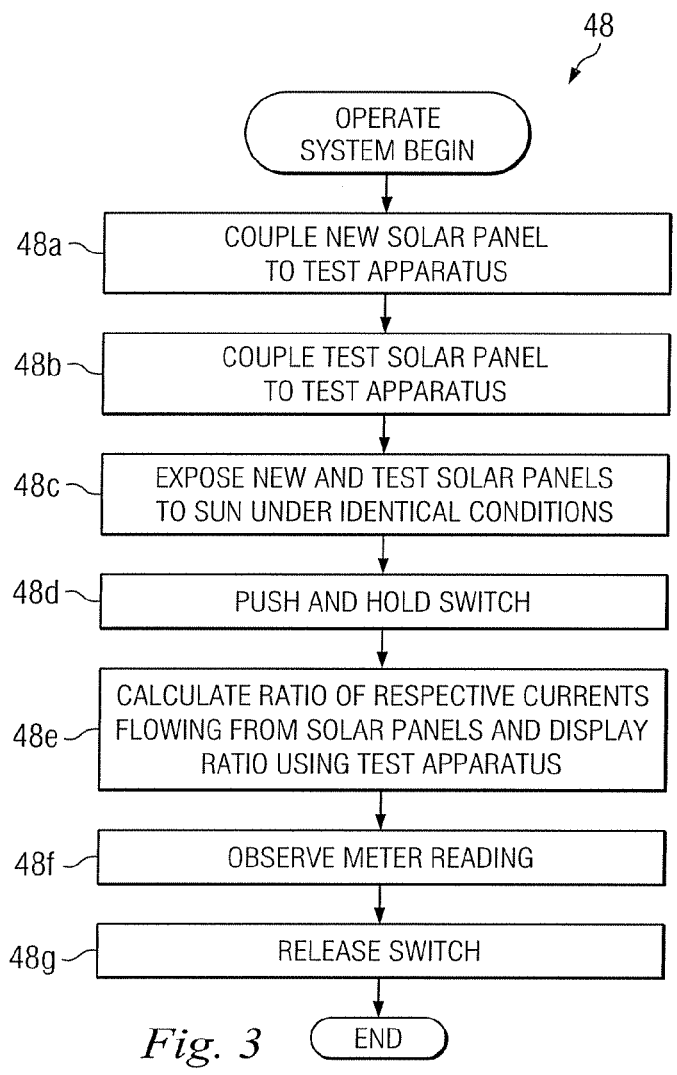
FIG. 3 is a flow chart illustration of a method of operating the system of FIG. 1 according to an exemplary embodiment.

In an exemplary embodiment, as illustrated in FIG. 3 with continuing reference to FIGS. 1 and 2, a method of operating the system 10 is generally referred to by the reference numeral 48 and includes electrically coupling the solar panel 14 to the test apparatus 12 in step 48a, electrically coupling the solar panel 16 to the test apparatus in step 48b, exposing the solar panels 14 and 16 to solar energy in step 48c, activating and holding the switch 24 in step 48d, and, in response to the step 48d, calculating a ratio of respective currents flowing from the solar panels 14 and 16 and displaying the ratio in step 48e. The ratio is then read in step 48f, after which the switch 24 is released in step 48g.

In an exemplary embodiment, to electrically couple the solar panel 14 to the test apparatus 12 in the step 48a, the test lead-in wire 38a is electrically coupled to the positive terminals 26a and 32a, and the test lead-in wire 38b is electrically coupled to the negative terminals 26b and 32b.

In an exemplary embodiment, to electrically couple the solar panel 16 to the test apparatus 12 in the step 48b, the test lead-in wire 40a is electrically coupled to the positive terminals 28a and 36a, and the test lead-in wire 40b is electrically coupled to the negative terminals 28b and 36b.

In an exemplary embodiment, to expose the solar panels 14 and 16 to solar energy in the step 48c, the solar panels 14 and 16 are exposed to sunlight under substantially identical conditions. More particularly, the orientation and angular position of the solar panel 14 with respect to the sun is substantially identical to the orientation and angular position of the solar panel 16 with respect to the sun, and the solar panels 14 and 16 are positioned so as to be exposed to the same amount of direct sunlight. In an exemplary embodiment, if necessary, the solar panels 14 and 16 are cleaned during the step 48c.

In an exemplary embodiment, to activate and hold the switch 24 in the step 48d, a toggle on the switch 24 is pushed in a direction opposite its biased direction and the toggle is held in place. As a result, the solar panel 14 is electrically coupled to the switch 24, the processor 42 and the fixed power load 44, and the solar panel 16 is electrically coupled to the switch 24, the processor 42, and the fixed power load 46.

In an exemplary embodiment, to calculate the ratio of respective currents flowing from the solar panel 14 and 16 and displaying the ratio using the test apparatus 12 in the step 48e, the amount of current flowing from the solar panel 14 is determined. More particularly, as a result of the step 48d, the solar panel 14 supplies electrical power to the fixed power load 44, and the processor 42 reads the amount of electrical current flowing from the solar panel 14. In addition to determining the amount of electrical current flowing from the solar panel 14, the amount of current flowing from the solar panel 16 is also determined in the step 48e. More particularly, as a result of the step 48d, the solar panel 16 supplies electrical power to the fixed power load 46, and the processor reads the amount of electrical current from the solar panel 16. After the respective amounts of electrical current flowing from the solar panels 14 and 16 are determined, the ratio between the respective amounts is calculated by the processor 42. In an exemplary embodiment, the ratio between the respective amounts is calculated by the processor 42 using floating point mathematics. After the ratio is calculated, the processor 42 outputs one or more signals corresponding to the ratio to the analog meter 23 and, in response, the needle 23a moves to a position along the scale, that is, from 0 to 100, thereby displaying the ratio.

In an exemplary embodiment, by calculating and displaying the ratio of respective currents flowing from the solar panels 14 and 16 in the step 48e, a direct comparison between respective operating parameters of the solar panels 14 and 16 is made. Since the solar panel 14 is a new solar panel and the solar panel 16 is a used solar panel, the solar panel 14 is considered a baseline, reference or benchmark, against which the solar panel 16 is to be tested or compared, and the execution of the step 48e provides, inter alia, an indication of the integrity of the internal electrical connections within the solar panel 16, and an indication of any operational or performance degradation of the solar panel 16 due to, for example, the use of the solar panel 16 in the field. If the needle 23a is positioned at or around 100 on the scale 23b, then the calculated ratio is about 1 and the solar panel 16 has undergone little or no operational or performance degradation. If the needle 23a is positioned at or around 0 on the scale 23b, then the calculated ratio is about 0 and the solar panel 16 has undergone complete or almost complete operational or performance degradation. The closer the needle 23a is to 0 on the scale 23b, then the greater the amount of operational or performance degradation experienced by the solar panel 16 over time. The closer the needle 23a is to 100 on the scale 23b, then the lesser the amount of operational or performance degradation experienced by the solar panel 16 over time.

In an exemplary embodiment, to read the ratio in the step 48f, the meter 23 is observed by, for example, a technician or operator. The position of the needle 23a relative to the scale 23b unambiguously communicates the degree to which the solar panel 16 has undergone any operational or performance degradation, thereby permitting the technician or operator to easily and almost instantaneously, or at least quickly, interpret and ascertain whether the internal electrical connections of the solar panel 16 are sound, and whether the solar panel 16 has experienced any operational or performance degradation over time and, if so, whether the degree of degradation is acceptable. In an exemplary embodiment, a percentage or number between 0 and 100 is selected as a threshold value and, if the needle 23a is below this threshold value on the scale 23b, then the technician or operator replaces the solar panel 16 with a new, or at least another, solar panel, or notes that the solar panel 16 should be replaced at a point in time in the future. In several exemplary embodiments, the threshold value may be selected based on historical solar panel performance data, numerical and/or analytic models, the amount of power supplied by the solar panel 16, other operating conditions or performance parameters of the solar panel 16, and/or any combination thereof. In an exemplary embodiment, the threshold value is 10 or 10%, 20 or 20%, 30 or 30%, 40 or 40%, 50 or 50%, 60 or 60%, 70 or 70%, or 80 or 80%. In an exemplary embodiment, the threshold value is any number or percentage between 0 and 100.

In an exemplary embodiment, after the ratio is read in the step 48f, the switch 24 is released in the step 48g, as noted above. As a result, the solar panels 14 and 16 no longer supply electrical power to the loads 44 and 46, respectively.

In an exemplary embodiment, during the step 48e, the apparatus 12 including the processor 42 is powered by the solar panel 14 and, as a result, the system 10 is self-powered. In an exemplary embodiment, the apparatus 12 including the processor 42 is powered using a relatively small amount of power from the solar panel 14, which amount of power does not substantially affect the accuracy of the ratio calculated in the step 48e. In an exemplary embodiment, the processor 42 is powered by the solar panel 14 in response to the step 48d, continues to be powered by the solar panel 14 during the steps 48f and 48g, and is no longer powered by the solar panel 14 in response to the step 48g. In an exemplary embodiment, during the step 48e, instead of, or in addition to the solar panel 14, the processor 42 is powered by the solar panel 16, one or more other power sources, and/or any combination thereof. In an exemplary embodiment, to read the amount of current flowing from each of the solar panels 14 and 16 in the step 48e and to calculate the above-described ratio, inter alia, the processor 42 executes one or more instructions stored in the computer readable medium 42a, another computer readable medium or memory module, and/or other computer readable media.

In several exemplary embodiments, during the step 48e, instead of, or in addition to the ratio of the respective amounts of electrical current flowing from the solar panels 14 and 16, one or more other ratios of respective operating parameters of the solar panels 14 and 16 are calculated, such as, for example, a ratio of respective output voltages of the solar panels 14 and 16, a ratio of respective amounts of electrical power supplied by the solar panels 14 and 16, and/or any combination thereof.

Figure 4:
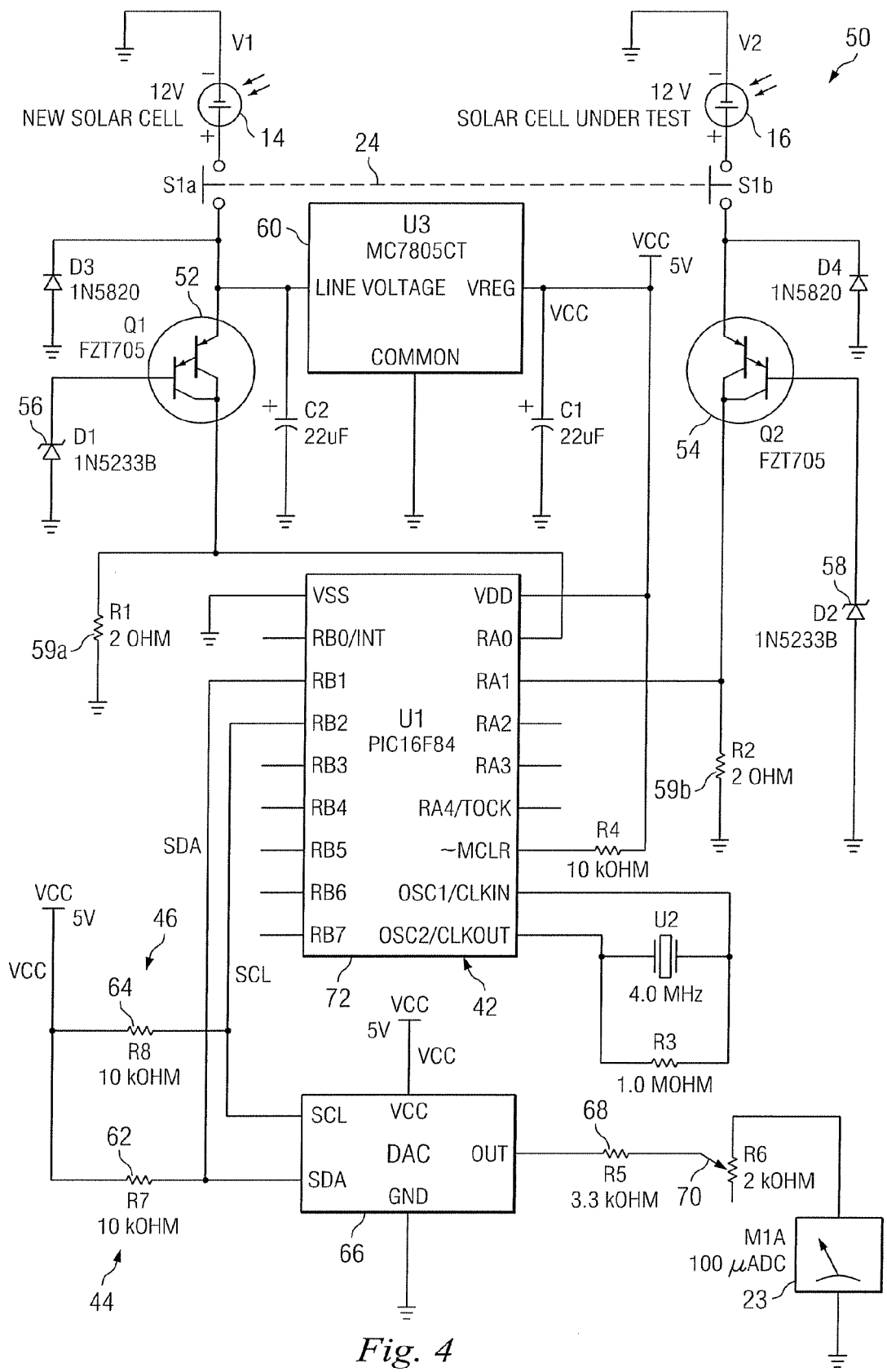
FIG. 4 is a diagrammatic illustration of a circuit of which the test apparatus and solar panels of FIG. 1 are a part, according to an exemplary embodiment.

In an exemplary embodiment, as illustrated in FIG. 4 with continuing reference to FIGS. 1, 2 and 3, the system 10 includes a circuit, which is generally referred to by the reference numeral 50 and includes the solar panels 14 and 16, the switch 24 in the form of a DPDT switch to which the solar panels 14 and 16 are selectively electrically coupled, the processor 42, the loads 44 and 46, and the meter 23.

As shown in FIG. 4, the circuit 50 further includes transistors 52 and 54, which are selectively electrically coupled to the solar panels 14 and 16, respectively, via the switch 24. Zener diodes 56 and 58 are electrically coupled to the transistors 52 and 54, respectively. Resistors 59a and 59b are electrically coupled to the transistors 52 and 54, respectively. The processor 42 is electrically coupled to each of the transistors 52 and 54. A voltage regulator 60 is selectively electrically coupled to the solar panel 14 via the switch 24. The load 44 includes a resistor 62, which is electrically coupled to the processor 42. Similarly, the load 46 includes a resistor 64, which is electrically coupled to the processor 42. A digital/analog (D/A) converter 66 is electrically coupled to the processor 42. A series resistor 68 is electrically coupled to the D/A converter 66, and a potentiometer 70 is electrically coupled to the resistor 68. The meter 23 is electrically coupled to the potentiometer 70. The processor 42 includes a programmable microcontroller 72 including a computer readable medium having a plurality of instructions stored therein, and further including one or more analog/digital (A/D) converters.

In operation, in an exemplary embodiment, the circuit 50 implements one or more of the steps of the method 48. After the steps 48a, 48b and 48c, the switch 24 is pushed and held in the step 48d, as described above, and, as a result, the circuit 50 calculates the ratio of respective currents flowing from the solar panels 14 and 16 and displays the ratio in the step 48e.

More particularly, during the step 48e, and in response to the pushing and holding of the switch 24 in the step 48d, the solar panels 14 and 16 supply electrical power to the transistors 52 and 54, respectively. The transistors 52 and 54 fix the output voltages of the solar panels 14 and 16, respectively. In an exemplary embodiment, each of the zener diodes 56 and 58 is a six-volt zener diode, and the transistors 52 and 54 fix the output voltage of each of the solar panels 14 and 16, respectively, at 7.2 volts, which is two base-emitter voltage drops above each of the six-volt zener diodes 56 and 58. The solar panel 14 powers the microcontroller 72, with the voltage regulator 60 maintaining the supply voltage to the microcontroller 72. The microcontroller 72 detects the respective voltages across the resistors 62 and 64, converts the voltages into respective digital words, and then performs a floating point division on the two words to thereby obtain a ratio between the two words, which ratio corresponds to the ratio between the respective currents flowing from the solar panels 14 and 16. The microcontroller 72 then scales the ratio between the two words to fit in an eight-bit byte, and sends the eight-bit byte to the D/A converter 66. In response, the D/A converter 66 converts the eight-bit byte and drives the meter 23 directly through the series resistor 68 and the potentiometer 70. As a result, the position of the needle 23a relative to the scale 23b of the meter 23 corresponds to the ratio calculated by the microcontroller 72, which, in turn, corresponds to the ratio of the respective currents flowing from the solar panels 14 and 16.

In an exemplary embodiment, since the output voltages of the solar panels 14 and 16 are fixed by the transistors 52 and 54, respectively, the currents that flow through the resistors 62 and 64 are directly proportional to the electrical power supplied by the solar panels 14 and 16, respectively. In an exemplary embodiment, since the voltages across the resistors 62 and 64 are directly proportional to the currents that flow through the resistors 62 and 64, respectively, the voltages across the resistors 62 and 64 are directly proportional to the electrical power supplied by the solar panels 14 and 16, respectively.

In an exemplary embodiment, during the steps 48e and 48f and while being powered by the solar panel 14, the microcontroller 72 continuously executes its instructions stored therein, thereby continuously repeating its above-described operation, including one or more of detecting respective voltages across the resistors 62 and 64, converting the voltages into respective digital words, obtaining a ratio between the two words, scaling the ratio to fit in an eight-bit byte, and sending the eight-bit byte to the D/A converter 66, until the switch 24 is released in the step 48g, at which point the microcontroller 72 is no longer powered.

In an exemplary embodiment, during the above-described operation of the circuit 50, the maximum amount of wattage or power that can be supplied by each of the solar panels 14 and 16, without harming the circuit 50 or its above-described operation, is limited by the electrical resistance provided by the resistors 59a and 59b, respectively. In an exemplary embodiment, the electrical resistance provided by each of the resistors 59a and 59b is two ohms, and the maximum amount of wattage or power that can be supplied by each of the solar panels 14 and 16, without harming the circuit 50 or its above-described operation, is ten watts.

Figure 5:
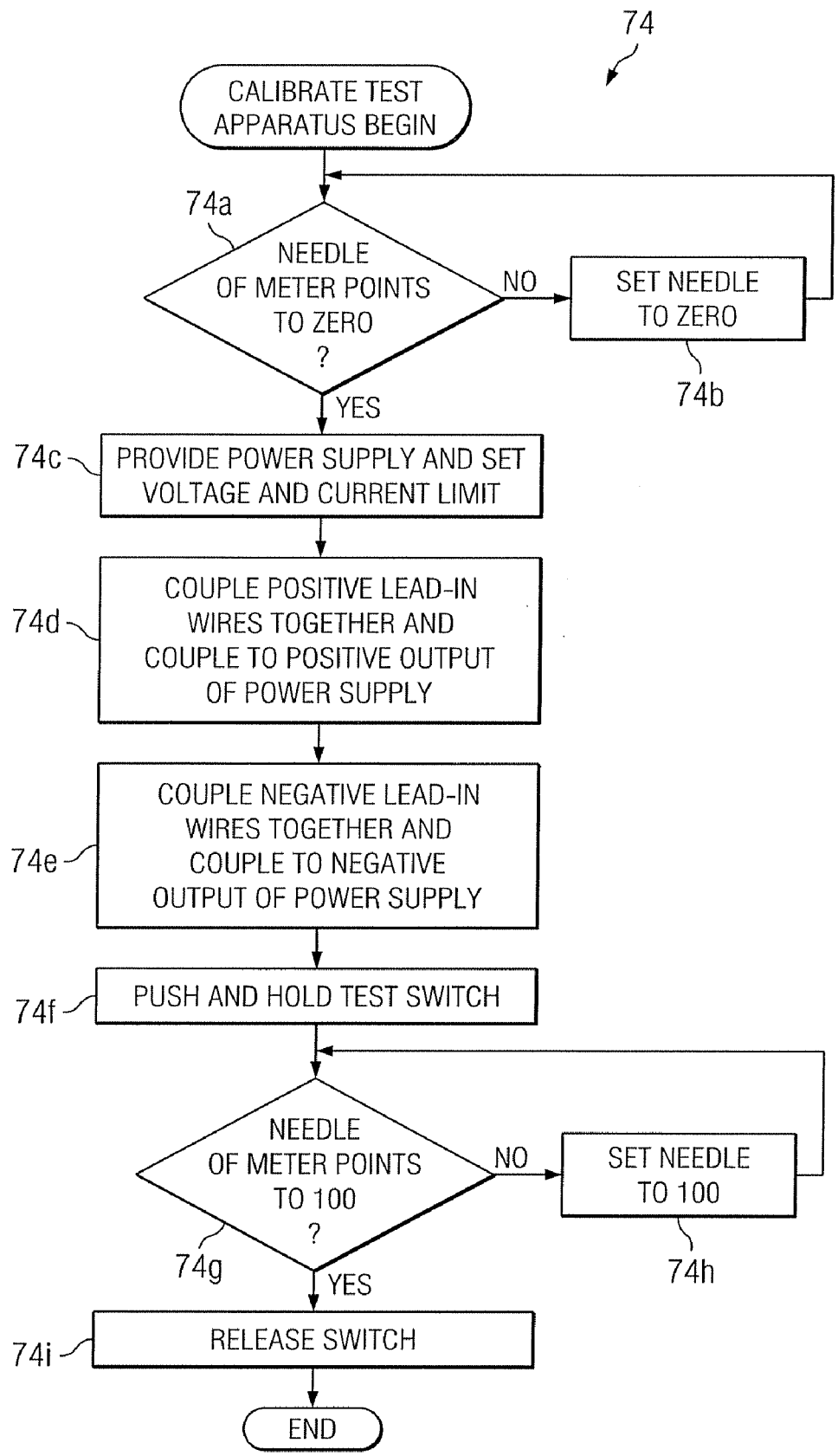
FIG. 5 is a flow chart illustration of a method of calibrating the system of FIG. 1 according to an exemplary embodiment, the system including the circuit of FIG. 4.
Figure 6:
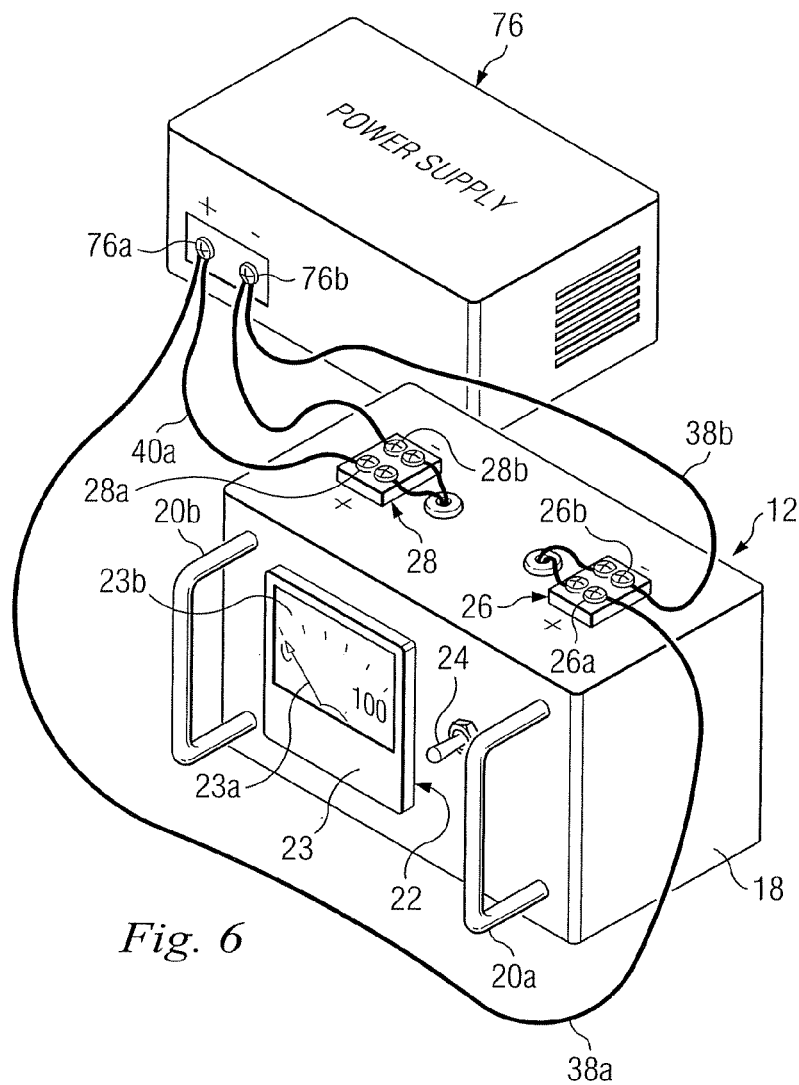
FIG. 6 is a perspective view of a power supply and the test apparatus of FIG. 1, according to respective exemplary embodiments, which are used in the method of FIG. 5.

In an exemplary embodiment, as illustrated in FIGS. 5 and 6 with continuing reference to FIGS. 1, 2, 3 and 4, a method of calibrating the apparatus 12 is generally referred to by the reference numeral 74 and includes, in step 74a, determining whether the needle 23a of the meter 23 points to zero on the scale 23b. During the step 74a, the apparatus 12 is not electrically coupled to any source of electrical power, including the solar panel 14, the solar panel 16, any type of power supply, or any other type of source of electrical power.

If it is determined in the step 74a that the needle 23a does not point to zero on the scale 23b, then the needle 23a is set to zero on the scale 23b in step 74b. In an exemplary embodiment, to set the needle 23a to zero on the scale 23b in the step 74b, an adjusting screw (not shown) on the face of the meter 23 is turned. The steps 74a and 74b are repeated until it is determined in the step 74a that the needle 23a points to zero on the scale 23b.

If it is determined in the step 74a that the needle 23a points to zero on the scale 23b, then, in step 74c, a power supply 76 (FIG. 6) including a positive output 76a and a negative output 76b is provided, and the voltage and current limit of the power supply 76 are set. In an exemplary embodiment, in the step 74c, the power supply 76 is set to twelve volts, and the current limit is set to two amps.

After the step 74c, the test lead-in wires 38a and 40a are electrically coupled together and to the positive output 76a of the power supply 76 in step 74d, as shown in FIG. 6. After the step 74d, the test lead-in wires 38b and 40b are electrically coupled together and to the negative output 76b of the power supply 76 in step 74e, as shown in FIG. 6.

After the steps 74d and 74e, the switch 24 is activated and held in step 74f, in a manner substantially similar to the manner described above with reference to the step 48d of the method 48. As a result, a ratio of respective voltages across the power loads 44 and 46 is calculated and displayed using the apparatus 12, in accordance with the foregoing. In an exemplary embodiment, the ratio of the respective voltages across the resistors 62 and 64 is calculated and displayed using the circuit 50, with the power supply 76 being substituted for both of the solar panels 14 and 16 in the circuit 50. In an exemplary embodiment, in response to the activation and holding of the switch 24 in the step 74f, the voltage on the power supply 76 drops from twelve to about seven-and-a-half volts, and the current is at about two amps.

As a result of the step 74f, the needle 23a moves relative to the scale 23b, and it is determined in step 74g whether the needle 23a points to 100 on the scale 23b. If not, then the needle 23a is set to 100 on the scale 23b in step 74h. In an exemplary embodiment, to set the needle 23a to 100 on the scale 23b in the step 74h, the potentiometer 70 of the circuit 50 is adjusted until the needle 23a points to 100 on the scale 23b, thereby calibrating the apparatus 12. The steps 74g and 74h are repeated until it is determined in the step 74g that the needle 23a points to 100 on the scale 23b, thereby confirming the calibration of the apparatus 12.

If it is determined in the step 74g that the needle 23a points to 100 on the scale 23b, then the calibration of the apparatus 12 is confirmed and the switch 24 is released in step 74i.

Figure 7:
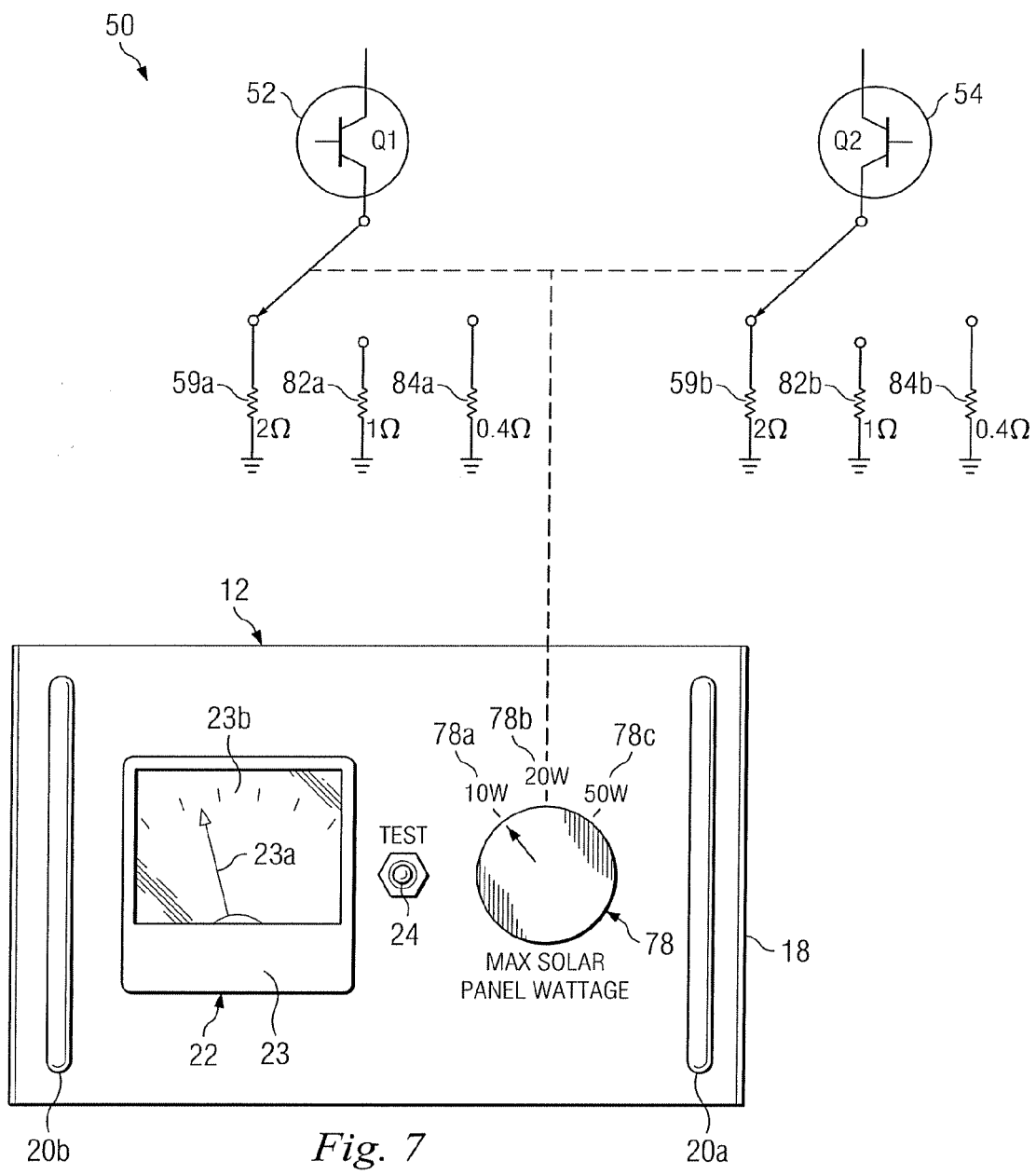
FIG. 7 is a diagrammatic illustration of a test apparatus according to another exemplary embodiment.

In an exemplary embodiment, as illustrated in FIG. 7 with continuing reference to FIGS. 1, 2, 3, 4, 5 and 6, the apparatus 12 further includes a rotary switch 78 engaged with the enclosure 18 and including operational positions 78a, 78b and 78c, and the circuit 50 further includes the switch 78, resistors 82a and 82b, and resistors 84a and 84b. Each of the resistors 59a, 82a and 84a is selectively electrically coupled to the transistor 52 via the switch 78. Similarly, each of the resistors 59b, 82b and 84b is selectively electrically coupled to the transistor 54 via the switch 78.

During the above-described operation of the circuit 50, in an exemplary embodiment, the operational position of the switch 78 determines the maximum amount of wattage or power that can be supplied by each of the solar panels 14 and 16, without harming the circuit 50 or its above-described operation. If the switch 78 is in the operational position 78a, then the resistors 59a and 59b are electrically coupled to the transistors 52 and 54, respectively, and the maximum wattage or power that can be supplied by each of the solar panels 14 and 16 is a certain value. If the switch 78 is in the operational position 78b, then the resistors 82a and 82b are electrically coupled to the transistors 52 and 54, respectively, and the maximum wattage or power that can be supplied by each of the solar panels 14 and 16 is another value. If the switch 78 is in the operational position 78c, then the resistors 84a and 84b are electrically coupled to the transistors 52 and 54, respectively, and the maximum wattage or power that can be supplied by each of the solar panels 14 and 16 is yet another value.

In an exemplary embodiment, the electrical resistance provided by each of the resistors 59a and 59b is two ohms and, when the switch 78 is in the operational position 78a, the maximum amount of wattage or power that can be supplied by each of the solar panels 14 and 16, without harming the circuit 50 or its above-described operation, is ten watts. In an exemplary embodiment, the electrical resistance provided by each of the resistors 82a and 82b is one ohm and, when the switch 78 is in the operational position 78b, the maximum amount of wattage or power that can be supplied by each of the solar panels 14 and 16, without harming the circuit 50 or its above-described operation, is twenty watts. In an exemplary embodiment, the electrical resistance provided by each of the resistors 84a and 84b is 0.4 ohms and, when the switch 78 is in the operational position 78c, the maximum amount of wattage or power that can be supplied by each of the solar panels 14 and 16, without harming the circuit 50 or its above-described operation, is fifty watts.

In an exemplary embodiment, the apparatus 12 includes one or more heat sinks disposed within the enclosure 18 and/or coupled to an external surface of the enclosure 18, which one or more heat sinks dissipate any heat generated by one or more components of the circuit 50, such as, for example, one or more of the resistors 59a, 59b, 82a, 82b, 84a and 84b. In an exemplary embodiment, the apparatus 12 includes a plurality of fins integrally formed with the enclosure 18, which fins dissipate any heat generated by one or more components of the circuit 50, such as, for example, one or more of the resistors 59a, 59b, 82a, 82b, 84a and 84b.

In an exemplary embodiment, each of the solar panels 14 and 16 is a single photovoltaic or solar cell. In an exemplary embodiment, each of the solar panels 14 and 16 is a single photovoltaic or solar cell, and does not include a frame. In an exemplary embodiment, each of the solar panels 14 and 16 includes one or more photovoltaic or solar cells. In an exemplary embodiment, instead of, or in addition to a panel, each of the solar panels 14 and 16 is in the shape, or form, of any type of solar module, array, device, etc. In an exemplary embodiment, instead of, or in addition to a frame and/or a junction box, each of the solar panels 14 and 16 includes other components, assemblies, systems, devices, etc.

Figure 8:
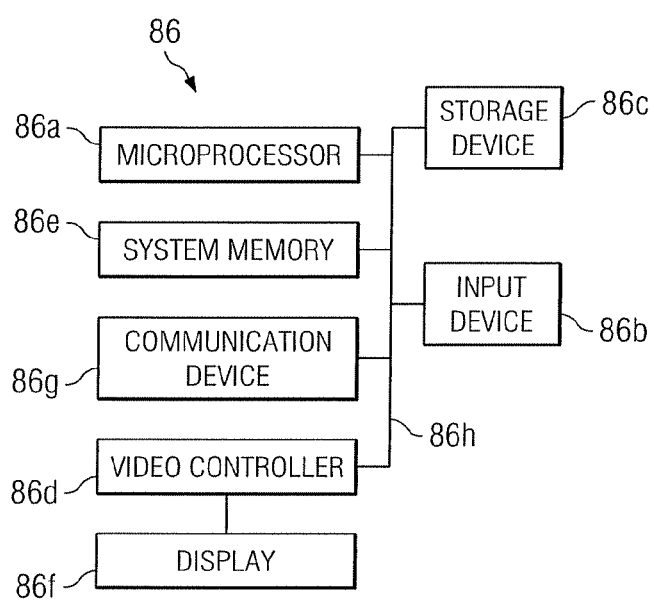
FIG. 8 is a diagrammatic illustration of a node for implementing one or more exemplary embodiments of the present disclosure.

In an exemplary embodiment, as illustrated in FIG. 8 with continuing reference to FIGS. 1, 2, 3, 4, 5, 6 and 7, an illustrative node 86 for implementing one or more embodiments of one or more of the above-described elements, methods and/or steps, and/or any combination thereof, is depicted. The node 86 includes a microprocessor 86a, an input device 86b, a storage device 86c, a video controller 86d, a system memory 86e, a display 86f, and a communication device 86g, all of which are interconnected by one or more buses 86h. In several exemplary embodiments, the storage device 86c may include a floppy drive, hard drive, CD-ROM, optical drive, any other form of storage device and/or any combination thereof. In several exemplary embodiments, the storage device 86c may include, and/or be capable of receiving, a floppy disk, CD-ROM, DVD-ROM, or any other form of computer readable medium that may contain executable instructions. In several exemplary embodiments, the communication device 86g may include a modem, network card, or any other device to enable the node to communicate with other nodes. In several exemplary embodiments, any node represents a plurality of interconnected (whether by intranet or Internet) computer systems, including without limitation, personal computers, mainframes, PDAs, and cellular telephones.

In an exemplary embodiment, the method 48 is implemented, at least in part, using the node 86 and/or one or more components thereof. In an exemplary embodiment, the method 74 is implemented, at least in part, using the node 86 and/or one or more components thereof. In an exemplary embodiment, the method 48 is combined in whole or in part with the method 74, and the combination is implemented, at least in part, using the node 86 and/or one or more components thereof.

In several exemplary embodiments, a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, personal digital assistants (PDAs), or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine.

In several exemplary embodiments, data structures are defined organizations of data that may enable an embodiment of the present disclosure. In an exemplary embodiment, a data structure may provide an organization of data, or an organization of executable code. In several exemplary embodiments, data signals could be carried across transmission mediums and store and transport various data structures, and, thus, may be used to transport an embodiment of the present disclosure.

In several exemplary embodiments, any networks described above may be designed to work on any specific architecture, and may be executed on a single computer, local area networks, client-server networks, wide area networks, internets, hand-held and other portable and wireless devices and networks.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

A system for testing a first solar panel has been described that includes an apparatus adapted to be electrically coupled to the first solar panel and a second solar panel, the apparatus comprising a processor; a memory comprising a plurality of instructions stored therein and executable by the processor, the plurality of instructions comprising instructions for calculating a ratio of respective operating parameters of the first and second solar panels; and an output device configured to display the ratio of the respective operating parameters of the first and second solar panels. In an exemplary embodiment, the apparatus further comprises a first load electrically coupled to the processor and adapted to be electrically coupled to the first solar panel; and a second load electrically coupled to the processor and adapted to be electrically coupled to the second solar panel; wherein the instructions for calculating the ratio of the respective operating parameters of the first and second solar panels comprise instructions for detecting an operating parameter of the first load; instructions for detecting an operating parameter of the second load; and instructions for calculating a ratio of the respective operating parameters of the first and second loads, wherein the ratio of the respective operating parameters of the first and second loads corresponds to the ratio of the respective operating parameters of the first and second solar panels. In an exemplary embodiment, the apparatus further comprises a switch electrically coupled to the processor; wherein, when the first and second solar panels are electrically coupled to the apparatus, the first and second loads are selectively electrically coupled to the first and second solar panels, respectively, via the switch. In an exemplary embodiment, when the first and second solar panels are electrically coupled to the first and second loads, respectively, the second solar panel supplies electrical power to the processor. In an exemplary embodiment, the respective operating parameters of the first and second solar panels comprise respective currents flowing from the first and second solar panels when the first and second solar panels are electrically coupled to the first and second loads, respectively; and wherein the respective operating parameters of the first and second loads comprise respective voltages across the first and second loads or portions thereof when the first and second solar panels are electrically coupled to the first and second loads, respectively. In an exemplary embodiment, the apparatus further comprises a switch comprising a plurality of operational positions, each of the operational positions of the switch corresponding to a maximum amount of electrical power that can be supplied to the apparatus by each of the first and second solar panels without harming the operation of the apparatus. In an exemplary embodiment, the apparatus further comprises a first switch electrically coupled to the processor, wherein, when the first and second solar panels are electrically coupled to the apparatus, the first and second loads are selectively electrically coupled to the first and second solar panels, respectively, via the first switch; a voltage regulator electrically coupled to the processor and selectively electrically coupled to the second solar panel via the first switch; first and second transistors electrically coupled to the processor, wherein, when the first and second solar panels are electrically coupled to the apparatus, the first and second transistors are selectively electrically coupled to the first and second solar panels, respectively, via the first switch, and the first and second transistors are configured to fix the output voltages of the first and second solar panels, respectively; and a second switch electrically coupled to at least one of the first and second transistors and selectively electrically coupling the at least one of the first and second transistors to a plurality of resistors, each of the resistors in the plurality of resistors corresponding to a maximum amount of power that can be supplied to the apparatus by at least one of the first and second solar panels without harming the operation of the apparatus; wherein the second switch comprises a plurality of operational positions, each of the operational positions corresponding to the selective electrical coupling of the at least one of the first and second transistors to one of the resistors in the plurality of resistors. In an exemplary embodiment, the system comprises the first solar panel electrically coupled to the apparatus; and the second solar panel electrically coupled to the apparatus. In an exemplary embodiment, the system comprises the first solar panel electrically coupled to the apparatus; and the second solar panel electrically coupled to the apparatus; wherein the apparatus further comprises a first load electrically coupled to the processor and adapted to be electrically coupled to the first solar panel; a second load electrically coupled to the processor and adapted to be electrically coupled to the second solar panel; and a switch electrically coupled to the processor, wherein the first and second solar panels are selectively electrically coupled to the first and second loads, respectively, via the switch; wherein the instructions for calculating the ratio of the respective operating parameters of the first and second solar panels comprise instructions for detecting an operating parameter of the first load; instructions for detecting an operating parameter of the second load; and instructions for calculating a ratio of the respective operating parameters of the first and second loads, the ratio of the respective operating parameters of the first and second loads corresponding to the ratio of the respective operating parameters of the first and second solar panels; wherein, when the first and second solar panels are electrically coupled to the first and second loads, respectively, the second solar panel supplies electrical power to the processor; the respective operating parameters of the first and second solar panels comprise respective currents flowing from the first and second solar panels; and the respective operating parameters of the first and second loads comprise respective voltages across the first and second loads or portions thereof.

A method of testing a first solar panel has been described that includes electrically coupling the first solar panel to a first load; electrically coupling a second solar panel to a second load; calculating a ratio of respective operating parameters of the first and second solar panels; and displaying the ratio of the respective operating parameters of the first and second solar panels. In an exemplary embodiment, calculating the ratio of the respective operating parameters of the first and second solar panels comprises detecting an operating parameter of the first load; detecting an operating parameter of the second load; and calculating a ratio of the respective operating parameters of the first and second loads, the ratio of the respective operating parameters of the first and second loads corresponding to the ratio of the respective operating parameters of the first and second solar panels. In an exemplary embodiment, the respective operating parameters of the first and second solar panels comprise respective currents flowing from the first and second solar panels; and wherein the respective operating parameters of the first and second loads comprise respective voltages across the first and second loads or portions thereof. In an exemplary embodiment, the method comprises electrically coupling a processor to the first and second loads; wherein the processor is powered by the second solar panel; and wherein calculating the ratio of the respective operating parameters of the first and second solar panels comprises calculating the ratio of the respective operating parameters of the first and second solar panels using the processor. In an exemplary embodiment, displaying the ratio of the respective operating parameters of the first and second solar panels comprises electrically coupling an output device to the processor; and wherein the method further comprises providing an apparatus comprising the processor, the first and second loads, and the output device; and calibrating the apparatus, comprising electrically coupling a power supply to the first and second loads; observing the output of the output device in response to electrically coupling the power supply to the first and second loads; and adjusting the output of the output device in response to observing the output of the output device. In an exemplary embodiment, a circuit is formed by at least the processor, the first and second solar panels, and the first and second loads; and wherein the method further comprises selecting a maximum of amount of electrical power that can be supplied by at least one of the first and second solar panels to the circuit without harming the operation of the circuit. In an exemplary embodiment, the method comprises electrically coupling a processor to the first and second loads; wherein the processor is powered by the second solar panel; wherein calculating the ratio of the respective operating parameters of the first and second solar panels comprises detecting an operating parameter of the first load using the processor; detecting an operating parameter of the second load using the processor; and calculating a ratio of the respective operating parameters of the first and second loads using the processor, the ratio of the respective operating parameters of the first and second loads corresponding to the ratio of the respective operating parameters of the first and second solar panels; wherein the respective operating parameters of the first and second solar panels comprise respective currents flowing from the first and second solar panels; wherein the respective operating parameters of the first and second loads comprise respective voltages across the first and second loads or portions thereof; and wherein displaying the ratio of the respective operating parameters of the first and second solar panels comprises electrically coupling an output device to the processor; and displaying the ratio of the respective operating parameters of the first and second solar panels using the output device.

A system for testing a first solar panel has been described that includes means for electrically coupling the first solar panel to a first load; means for electrically coupling a second solar panel to a second load; means for calculating a ratio of respective operating parameters of the first and second solar panels; and means for displaying the ratio of the respective operating parameters of the first and second solar panels. In an exemplary embodiment, means for calculating the ratio of the respective operating parameters of the first and second solar panels comprises means for detecting an operating parameter of the first load; means for detecting an operating parameter of the second load; and means for calculating a ratio of the respective operating parameters of the first and second loads, the ratio of the respective operating parameters of the first and second loads corresponding to the ratio of the respective operating parameters of the first and second solar panels. In an exemplary embodiment, the respective operating parameters of the first and second solar panels comprise respective currents flowing from the first and second solar panels; and wherein the respective operating parameters of the first and second loads comprise respective voltages across the first and second loads or portions thereof. In an exemplary embodiment, the system comprises means for electrically coupling a processor to the first and second loads; wherein the processor is powered by the second solar panel; and wherein means for calculating the ratio of the respective operating parameters of the first and second solar panels comprises means for calculating the ratio of the respective operating parameters of the first and second solar panels using the processor. In an exemplary embodiment, means for displaying the ratio of the respective operating parameters of the first and second solar panels comprises means for electrically coupling an output device to the processor; and wherein the system further comprises means for providing an apparatus comprising the processor, the first and second loads, and the output device; and means for calibrating the apparatus, comprising means for electrically coupling a power supply to the first and second loads; means for observing the output of the output device in response to electrically coupling the power supply to the first and second loads; and means for adjusting the output of the output device in response to observing the output of the output device. In an exemplary embodiment, a circuit is formed by at least the processor, the first and second solar panels, and the first and second loads; and wherein the system further comprises means for selecting a maximum of amount of electrical power that can be supplied by at least one of the first and second solar panels to the circuit without harming the operation of the circuit. In an exemplary embodiment, the system comprises means for electrically coupling a processor to the first and second loads; wherein the processor is powered by the second solar panel; and wherein means for calculating the ratio of the respective operating parameters of the first and second solar panels comprises means for detecting an operating parameter of the first load using the processor; means for detecting an operating parameter of the second load using the processor; and means for calculating a ratio of the respective operating parameters of the first and second loads using the processor, the ratio of the respective operating parameters of the first and second loads corresponding to the ratio of the respective operating parameters of the first and second solar panels; wherein the respective operating parameters of the first and second solar panels comprise respective currents flowing from the first and second solar panels; wherein the respective operating parameters of the first and second loads comprise respective voltages across the first and second loads or portions thereof; and wherein means for displaying the ratio of the respective operating parameters of the first and second solar panels comprises means for electrically coupling an output device to the processor; and means for displaying the ratio of the respective operating parameters of the first and second solar panels using the output device.

A computer readable medium has been described that includes a plurality of instructions stored therein, the plurality of instructions comprising instructions for calculating a ratio of respective operating parameters of first and second solar panels electrically coupled to first and second loads, respectively; and instructions for displaying the ratio of the respective operating parameters of the first and second solar panels. In an exemplary embodiment, the instructions for calculating the ratio of the respective operating parameters of the first and second solar panels comprise instructions for detecting an operating parameter of the first load; instructions for detecting an operating parameter of the second load; and instructions for calculating a ratio of the respective operating parameters of the first and second loads, the ratio of the respective operating parameters of the first and second loads corresponding to the ratio of the respective operating parameters of the first and second solar panels. In an exemplary embodiment, the respective operating parameters of the first and second solar panels comprise respective currents flowing from the first and second solar panels; and wherein the respective operating parameters of the first and second loads comprise respective voltages across the first and second loads or portions thereof. In an exemplary embodiment, a circuit is formed by at least the first and second solar panels, and the first and second loads; and wherein the plurality of instructions further comprises instructions for selecting a maximum of amount of electrical power that can be supplied by at least one of the first and second solar panels to the circuit without harming the operation of the circuit.

It is understood that variations may be made in the foregoing without departing from the scope of the disclosure. For example, instead of, or in addition to oil and gas exploration, development, and/or production operations, one or more of the above-described systems, devices and/or methods, and/or any combination thereof, may be employed in other applications, operations, and/or environments, such as, for example, telecommunication applications, electricity-related applications, or any environment utilizing one or more solar cells. Furthermore, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A system for testing a first solar panel, the system comprising:
 an apparatus adapted to be electrically coupled to the first solar panel and a second solar panel, the apparatus comprising:
  a processor;
  a memory comprising a plurality of instructions stored therein and executable by the processor, the plurality of instructions comprising instructions for calculating a ratio of respective operating parameters of the first and second solar panels;

an output device configured to display the ratio of the respective operating parameters of the first and second solar panels;

a first load electrically coupled to the processor and adapted to be electrically coupled to the first solar panel; and a second load electrically coupled to the processor and adapted to be electrically coupled to the second solar panel; and wherein the instructions for calculating the ratio of the respective operating parameters of the first and second solar panels comprise:

instructions for detecting an operating parameter of the first load;

instructions for detecting an operating parameter of the second load; and instructions for calculating a ratio of the respective operating parameters of the first and second loads, wherein the ratio of the respective operating parameters of the first and second loads corresponds to the ratio of the respective operating parameters of the first and second solar panels.

2. The system of claim 1 wherein the apparatus further comprises:

a switch electrically coupled to the processor;

wherein, when the first and second solar panels are electrically coupled to the apparatus, the first and second loads are selectively electrically coupled to the first and second solar panels, respectively, via the switch.

3. The system of claim 1 wherein, when the first and second solar panels are electrically coupled to the first and second loads, respectively, the second solar panel supplies electrical power to the processor.

4. The system of claim 1 wherein the respective operating parameters of the first and second solar panels comprise respective currents flowing from the first and second solar panels when the first and second solar panels are electrically coupled to the first and second loads, respectively; and wherein the respective operating parameters of the first and second loads comprise respective voltages across the first and second loads or portions thereof when the first and second solar panels are electrically coupled to the first and second loads, respectively.

5. The system of claim 1 wherein the apparatus further comprises:

a switch comprising a plurality of operational positions, each of the operational positions of the switch corresponding to a maximum amount of electrical power that can be supplied to the apparatus by each of the first and second solar panels without harming the operation of the apparatus.

6. The system of claim 1 wherein the apparatus further comprises:

a first switch electrically coupled to the processor, wherein, when the first and second solar panels are electrically coupled to the apparatus, the first and second loads are selectively electrically coupled to the first and second solar panels, respectively, via the first switch;

a voltage regulator electrically coupled to the processor and selectively electrically coupled to the second solar panel via the first switch;

first and second transistors electrically coupled to the processor, wherein, when the first and second solar panels are electrically coupled to the apparatus, the first and second transistors are selectively electrically coupled to the first and second solar panels, respectively, via the first switch, and the first and second transistors are configured to fix the output voltages of the first and second solar panels, respectively; and a second switch electrically coupled to at least one of the first and second transistors and selectively electrically coupling the at least one of the first and second transistors to a plurality of resistors, each of the resistors in the plurality of resistors corresponding to a maximum amount of power that can be supplied to the apparatus by at least one of the first and second solar panels without harming the operation of the apparatus;

wherein the second switch comprises a plurality of operational positions, each of the operational positions corresponding to the selective electrical coupling of the at least one of the first and second transistors to one of the resistors in the plurality of resistors.

7. The system of claim 1 further comprising:

the first solar panel electrically coupled to the apparatus; and the second solar panel electrically coupled to the apparatus.

8. The system of claim 1 further comprising:

the first solar panel electrically coupled to the apparatus; and the second solar panel electrically coupled to the apparatus;

wherein the apparatus further comprises; and a switch electrically coupled to the processor, wherein the first and second solar panels are selectively electrically coupled to the first and second loads, respectively, via the switch;

wherein, when the first and second solar panels are electrically coupled to the first and second loads, respectively, the second solar panel supplies electrical power to the processor;

the respective operating parameters of the first and second solar panels comprise respective currents flowing from the first and second solar panels; and the respective operating parameters of the first and second loads comprise respective voltages across the first and second loads or portions thereof.

9. A method of testing a first solar panel, the method comprising:

electrically coupling the first solar panel to a first load;

electrically coupling a second solar panel to a second load;

calculating, using one or more processors, a ratio of respective operating parameters of the first and second solar panels, wherein calculating, using one or more processors, the ratio of the respective operating parameters of the first and second solar panels comprises:

detecting an operating parameter of the first load;

detecting an operating parameter of the second load; and calculating a ratio of the respective operating parameters of the first and second loads, the ratio of the respective operating parameters of the first and second loads corresponding to the ratio of the respective operating parameters of the first and second solar panels; and displaying the ratio of the respective operating parameters of the first and second solar panels.

10. The method of claim 9 wherein the respective operating parameters of the first and second solar panels comprise respective currents flowing from the first and second solar panels; and wherein the respective operating parameters of the first and second loads comprise respective voltages across the first and second loads or portions thereof.

11. The method of claim 9 further comprising:
electrically coupling a processor to the first and second loads;
wherein the processor is powered by the second solar panel; and
wherein calculating the ratio of the respective operating parameters of the first and second solar panels comprises calculating the ratio of respective power outputs of the first and second solar panels using the processor.

12. The method of claim 11 wherein displaying the ratio of the respective operating parameters of the first and second solar panels comprises electrically coupling an output device to the processor; and
wherein the method further comprises:
providing an apparatus comprising the processor, the first and second loads, and the output device; and
calibrating the apparatus, comprising:
electrically coupling a power supply to the first and second loads;
observing the output of the output device in response to electrically coupling the power supply to the first and second loads; and
adjusting the output of the output device in response to observing the output of the output device.

13. The method of claim 11 wherein a circuit is formed by at least the processor, the first and second solar panels, and the first and second loads; and
wherein the method further comprises:
selecting a maximum of amount of electrical power that can be supplied by at least one of the first and second solar panels to the circuit without harming the operation of the circuit.

14. The method of claim 9 further comprising:
electrically coupling a processor to the first and second loads;
wherein the processor is powered by the second solar panel;
wherein calculating the ratio of the respective operating parameters of the first and second solar panels comprises:
detecting the operating parameter of the first load using the processor;
detecting the operating parameter of the second load using the processor; and
calculating the ratio of the respective operating parameters of the first and second loads using the processor;
wherein the respective operating parameters of the first and second loads comprise respective voltages across the first and second loads or portions thereof; and
wherein displaying the ratio of the respective operating parameters of the first and second solar panels comprises:
electrically coupling an output device to the processor; and
displaying the ratio of the respective operating parameters of the first and second solar panels using the output device.

15. A system for testing a first solar panel, the system comprising:
means for electrically coupling the first solar panel to a first load;
means for electrically coupling a second solar panel to a second load;
means for calculating a ratio of respective operating parameters of the first and second solar panels, wherein the means for calculating the ratio of the respective operating parameters of the first and second solar panels comprises:
means for detecting an operating parameter of the first load;
means for detecting an operating parameter of the second load; and
means for calculating a ratio of the respective operating parameters of the first and second loads, the ratio of the respective operating parameters of the first and second loads corresponding to the ratio of the respective operating parameters of the first and second solar panels; and
means for displaying the ratio of the respective operating parameters of the first and second solar panels.

16. The system of claim 15 wherein the respective operating parameters of the first and second solar panels comprise respective currents flowing from the first and second solar panels; and
wherein the respective operating parameters of the first and second loads comprise respective voltages across the first and second loads or portions thereof.

17. The system of claim 15 further comprising:
means for electrically coupling a processor to the first and second loads;
wherein the processor is powered by the second solar panel; and
wherein means for calculating the ratio of the respective operating parameters of the first and second solar panels comprises means for calculating the ratio of respective power outputs of the first and second solar panels using the processor.

18. The system of claim 17 wherein means for displaying the ratio of the respective operating parameters of the first and second solar panels comprises means for electrically coupling an output device to the processor; and
wherein the system further comprises:
means for providing an apparatus comprising the processor, the first and second loads, and the output device; and
means for calibrating the apparatus, comprising:
means for electrically coupling a power supply to the first and second loads;
means for observing the output of the output device in response to electrically coupling the power supply to the first and second loads; and
means for adjusting the output of the output device in response to observing the output of the output device.

19. The system of claim 17 wherein a circuit is formed by at least the processor, the first and second solar panels, and the first and second loads; and
wherein the system further comprises:
means for selecting a maximum of amount of electrical power that can be supplied by at least one of the first and second solar panels to the circuit without harming the operation of the circuit.

20. The system of claim 15 further comprising:
means for electrically coupling a processor to the first and second loads;
wherein the processor is powered by the second solar panel; and
wherein the means for calculating the ratio of the respective operating parameters of the first and second solar panels comprises:

means for detecting the operating parameter of the first load using the processor;

means for detecting the operating parameter of the second load using the processor; and means for calculating the ratio of the respective operating parameters of the first and second loads using the processor, the ratio of the respective operating parameters of the first and second loads corresponding to the ratio of the respective operating parameters of the first and second solar panels;

wherein the respective operating parameters of the first and second loads comprise respective voltages across the first and second loads or portions thereof; and wherein means for displaying the ratio of the respective operating parameters of the first and second solar panels comprises:

means for electrically coupling an output device to the processor; and means for displaying the ratio of the respective operating parameters of the first and second solar panels using the output device.

21. A non-transitory computer readable memory having stored therein a plurality of computer instructions which, when executed by a computer processor, cause the computer processor to:

calculate a direct ratio of respective power outputs of first and second solar panels in response to simultaneous exposure to direct sunlight, the first and second solar panels being electrically coupled to first and second loads, respectively, the instructions for calculating the ratio of the respective power outputs of the first and second solar panels comprising:

instructions for detecting an operating parameter of the first load;

instructions for detecting an operating parameter of the second load; and instructions for calculating a ratio of the respective operating parameters of the first and second loads, the ratio of the respective operating parameters of the first and second loads corresponding to the ratio of the respective power outputs of the first and second solar panels; and display the ratio of the respective power outputs of the first and second solar panels.

22. The non-transitory computer readable memory of claim 21 wherein the respective operating parameters of the first and second loads comprise respective voltages across the first and second loads or portions thereof.

23. The non-transitory computer readable memory of claim 21 wherein a circuit is formed by at least the first and second solar panels, and the first and second loads; and wherein the plurality of instructions further comprises:

instructions for selecting a maximum of amount of electrical power that can be supplied by at least one of the first and second solar panels to the circuit without harming the operation of the circuit.

* * * * *